Aug. 14, 1951  E. Y. SEBORG ET AL  2,564,613
INDEXING MECHANISM
Filed March 29, 1946  3 Sheets-Sheet 1
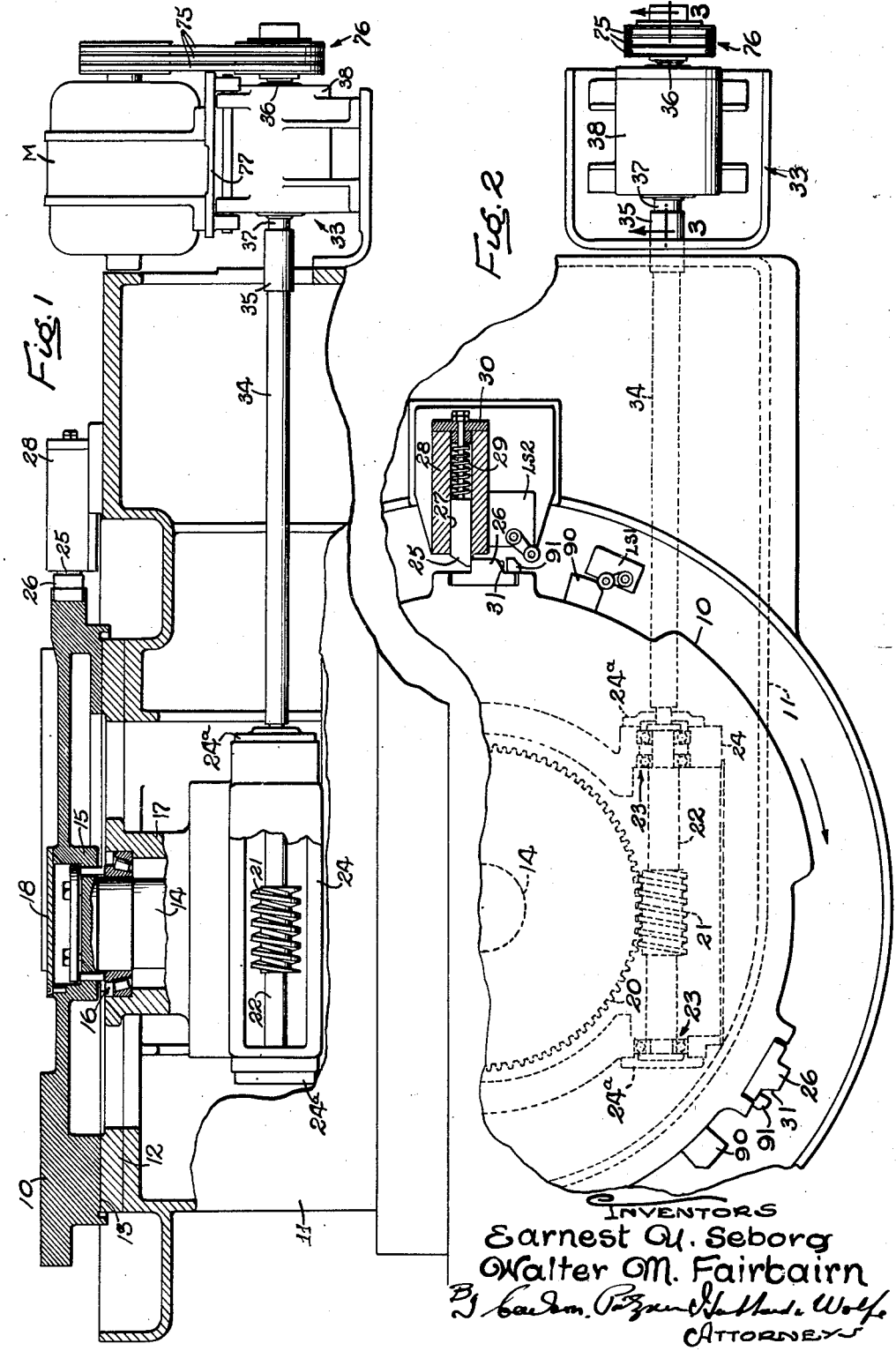
INVENTORS
Earnest Y. Seborg
Walter M. Fairbairn
ATTORNEYS Aug. 14, 1951          E. Y. SEBORG ET AL          2,564,613
                       INDEXING MECHANISM
Filed March 29, 1946                              3 Sheets-Sheet 2
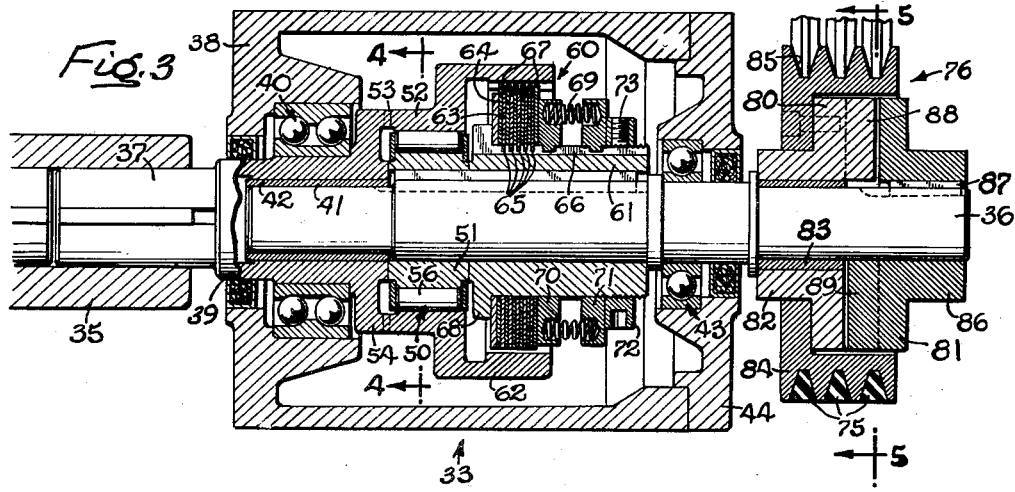
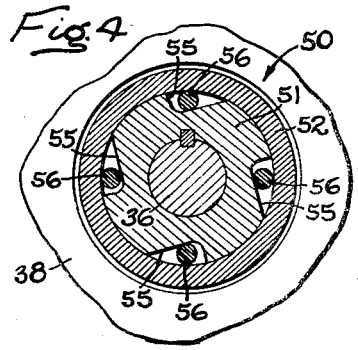
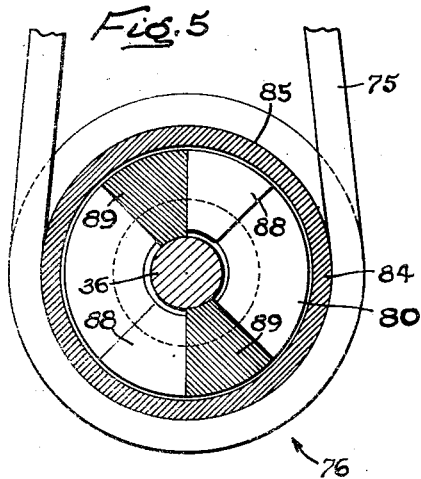
INVENTORS
Earnest Y. Seborg
Walter M. Fairbairn
ATTORNEYS Patented Aug. 14, 1951

2,564,613

UNITED STATES PATENT OFFICE 2,564,613

INDEXING MECHANISM

Earnest Y. Seborg and Walter M. Fairbairn, Rockford, Ill., assignors to Barnes Drill Co., Rockford, Ill., a corporation of Illinois Application March 29, 1946, Serial No. 658,148

6 Claims. (Cl. 90—56)

The invention relates to indexing mechanism for shiftable machine elements such as the worktables of machine tools.

Various types of machine tools are equipped with worktables which are shifted or indexed periodically to carry workpieces in succession through a station or a series of such stations at which machining operations are performed on the work. Because of the high degree of precision required in most machine work in present-day practice it is essential to stop the table in a position to locate the work accurately at the operating stations and to hold it rigidly fixed so as to prevent even the slightest movement of the work during the machining operation.

The primary object of the present invention is to provide an improved indexing mechanism adapted to locate the table accurately at each indexing station and to positively lock the table in indexed position between successive steps.

Another object is to provide indexing mechanism of the type adapted to advance the machine table slightly beyond the indexed position and then reverse the movement to bring the table into engagement with a fixed stop wherein the forward movement or advance of the table is effected through the medium of positively acting means and reverse movement is effected by nonpositive means effected to hold the table securely in abutment with the stop.

Another object is to provide coupling means particularly suitable for indexing a worktable and operative to provide a positive drive in one direction and a nonpositive drive in the opposite direction.

Still another object is to provide means for effectually breaking the locking engagement between the worm and worm wheel of a worm drive mechanism.

A further object is to provide indexing mechanism which is simple and rugged in construction, efficient and reliable in operation and capable of locating the indexed machine element with a high degree of accuracy and to rigidly maintain the element in the located position.

Other objects and advantages of the invention will become apparent from the following detailed description of the preferred embodiment illustrated in the accompanying drawings in which:

Figure 1 is a vertical sectional machine view of a machine tool worktable equipped with indexing mechanism embodying the features of the invention.

Fig. 2 is a fragmentary plan view of the table and associated indexing mechanism.

Fig. 3 is a sectional view of the coupling means constituting a part of the indexing mechanism taken in a horizontal plane substantially on the line 3—3 of Fig. 2.

Figure 6:
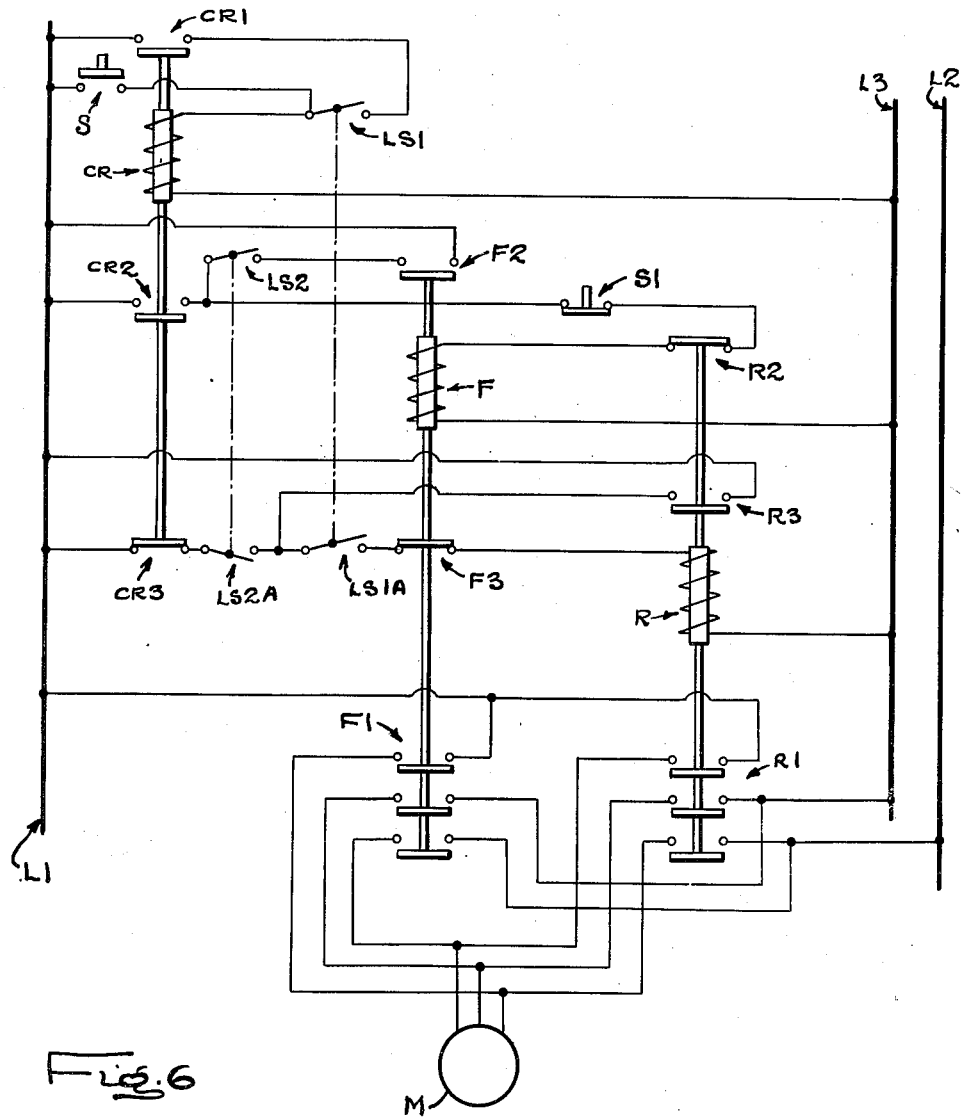

Figs. 4 and 5 are respectively sectional views taken in vertical planes substantially on the lines 4—4 and 5—5 of Fig. 3.

Fig. 6 is a diagrammatic view of the operating and control circuits for the mechanism.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

For purposes of illustration, the improved indexing mechanism has been shown as applied to a worktable 10 supported for rotation about a vertical axis upon a rigid base or frame 11. Support for the table is provided by an annular bearing or guideway 12 carried by the base 11 and cooperating with a complemental bearing surface 13 formed on the underside of the table. A cylindrical shaft or base 14 rigidly fitted in a hub 15 formed centrally of the table 10 guides the table in its indexing movements and provides a driving connection with the indexing mechanism as will appear presently. The post 14 as herein shown is journaled in an antifriction bearing 16 fitted in a housing structure 17 enclosed within and rigid with the base 11. A cover plate 18 removably secured to the table closes the open end of the hub 15 to prevent entrance of metal chips or the like.

Indexing movements are imparted to the table 10 through a worm wheel 20 (Fig. 2) keyed to the post 14 and meshing with a worm 21 rigid with a horizontally disposed shaft 22. In the exemplary machine structure the shaft 22 is supported for rotation but rigidly held against axial movement in antifriction bearings 23 fitted in a cylindrical casing 24 disposed at one side of and suitably secured to the housing 17. The casing is closed at opposite ends by end caps 24ª, one having an opening for the accommodation of the projecting end of the worm shaft 22.

In accordance with the present invention, indexing of the table 10 to carry a workpiece from one indexed position to another is effected by advancing the table clockwise as viewed in Fig. 2 to carry the workpiece slightly beyond the indexed position and then reversing the direction of rotation until such movement of the table is interrupted by a fixed stop 25 mounted on the base 11 which serves to accurately position the work at the indexed position. For this purpose the table is provided with a series of work locating members 26, one for each work holding position on the table, which members are adapted to coact successively with the fixed stop 25 in the reverse movement of the table. In the exemplary machine the locating members are spaced apart approximately 120° to provide for presentation of workpieces to three similarly spaced stations. The locating members are preferably constructed separately from the table for convenient replacement in case of wear and are mounted in notches formed in the peripheral edge of the table so as to project radially therefrom. It will be understood that the table 10 is provided with suitable work holding fixtures accurately positioned with respect to the locating members.

To enable the stop member 25 to interrupt reverse movement of the table without interfering with forward movements the member is constructed in the form of an elongated bar or plunger and is supported for endwise sliding movement radially of the table 10. Support for the stop member 25 is provided by a socket 27 formed in a supporting member or bracket 28 rigidly secured to the base 11 at one side of the table. A spring 29 interposed between the inner end of the stop member and a cap 30 closing the outer end of the socket 27 urges the plunger toward the table 10 and into the path described by the locating members 26 in the rotation of the table.

To effect withdrawal of the stop member 25 in the forward movement of the table the leading faces of the locating members 26 are beveled to present inclined cam surfaces 31 adapted to coact with a rearwardly inclined cam surface on the outer end of the stop member. The stop member is thus forced inwardly as each locating member passes the indexed position in the forward movement of the table and is thereafter projected outwardly for engagement by the locating member upon reversal of table movement. The coacting rear faces of the stop and stop-engaging members are formed to lie substantially perpendicular to the path described by the locating members so that no camming action takes place on reverse movement of the table and such movement is therefore effectually interrupted by the stop.

In accordance with the invention the periodic advance and reversal of the table 10 is effected by novel indexing mechanism including a reversible power source connected with the worm shaft 22 by coupling means 33 arranged to provide a positive driving connection for advancing the table and a slip or nonpositive driving connection for moving the table reversely against the stop 25. The power source, herein shown as a reversible electric motor M, is started, stopped and reversed in timed relation to the movements of the table by suitable control instrumentalities such as electric switches. Means is also incorporated in the drive mechanism for imparting a sharp blow to the worm shaft at the start of the forward drive so as to break the locking engagement of the worm and worm wheel resulting from the wedging of the table against the fixed stop.

Referring to Fig. 3 of the drawings, the coupling means 33 in its preferred form comprises a pair of coaxially alined shafts 36 and 37 rotatably supported in a housing 38 with the shafts projecting therefrom at opposite ends. The shaft 37 which constitutes the driven shaft of the coupling means is connected with the worm shaft 22 by an intermediate shaft 34 and coupling 35. At its inner end the shaft 37 is formed with an enlarged section 39 which is journaled in a wide antifriction bearing 40 seated in one end wall of the housing 38. Support for the driving shaft 36 is provided by a bearing sleeve 41 fitted in a recess 42 in the end section 39 of the shaft 37 and by an antifriction bearing 43 seated in the opposite end wall 44 of the housing 38. The end wall 44 is preferably removably secured to the housing to provide convenient access to the interior thereof.

The positive driving connection between the shafts 36 and 37 for advancing the table 10 is provided by an overrunning or one-way clutch 50 comprising a generally cylindrical driving member 51 keyed to the shaft 36 and a driven member 52 rigid with the shaft 37. While the clutch member 52 may be formed integrally with the shaft 37 if desired, for convenience of assembly it is preferred to form it as a separate part and to couple it with the shaft by means of interengaging axially projecting teeth 53 formed respectively on a radially projecting flange 54 on the shaft and on the adjacent end of the clutch member.

In the particular clutch shown, the driving member 51 is formed with a plurality of circumferentially spaced longitudinally disposed grooves 55 for the accommodation of roller elements 56. As will be seen by reference to Fig. 4 of the drawings, the grooves 55 are tapered transversely of the member so that upon counterclockwise rotation of the member the rollers 56 are wedged against the inner surface of the driven clutch member 52 to effect a positive driving connection therewith. Upon rotation of the member 51 in the opposite direction the rollers 56 are shifted to the deeper portions of their grooves thus interrupting the driving connection and permitting the member 51 to rotate while the member 52 remains stationary.

The nonpositive or slip connection between the shafts 36 and 37 for rotating the table 10 reversely is provided by a friction coupling 60 which may be of any preferred construction. As herein shown, the coupling 60 comprises a conventional multiple disk clutch including a driving member 61 keyed to the shaft 36 and projecting into an enlarged drum-shaped driven member 62 integral with and projecting axially from the member 52 which, as above explained, is drivingly coupled with the shaft 37. A plurality of alternately stacked annular friction disks or plates 63 and 64 are mounted on the driving member 61 within the member 62, the plates 63 being coupled with the driving member 61 and the plates 64 similarly coupled with the driven member 62. For effecting such coupling the plates 63 are formed with inwardly projecting radial lugs 65 engaging in a longitudinally disposed slot 66 in the member 61 while the plates 64 are formed with outwardly projecting radial lugs 67 engaging in a longitudinal slot in the inner wall of the driven clutch member 62.

The plates 63 and 64 are pressed into frictional engagement against an abutment or circumferential flange 68 at the inner end of the member 61 by suitable compression springs 69. As herein shown, the springs 69 are interposed between a pair of annular thrust plates 70 and 71 slidably supported on the member 61. The thrust plate 70 is positioned to bear against the outer friction plate 64 of the stack while the thrust plate 71 is held against movement axially of the member by a collar 72 secured to the member as by a setscrew 73.

The tension of the springs 69 may be adjusted to regulate the driving power of the coupling by shifting the collar 72 along the member. In practice the springs are set so that sufficient power is transmitted through the coacting friction plates to back the active stop-engaging member 26 firmly against the fixed stop 25 and to permit the friction plates to slip thereafter to avoid damaging the drive mechanism. Thus the table is accurately located in indexed position and the worm 21 is wedged tightly against the worm wheel 20 so as to lock the table in such position until the drive mechanism is reversed to advance the table in the succeeding indexing cycle.

As shown in Fig. 1 of the drawings, the shaft 36 is driven by the motor M through the medium of a multiple V-belt 75 running over a grooved pulley 76 fast on the projecting end of the shaft. In the exemplary machine the motor M is supported on a plate 77 mounted on the housing 38 for rocking movement whereby the tension of the belt 75 may be adjusted.

Means is incorporated in the pulley 76 to insure breaking of the locking engagement between the worm 21 and worm wheel 20 when the motor M is started to advance the table following a dwell of the table at an indexed position. This means, as herein shown, is in the form of a lost motion coupling constructed so as to permit the motor M to accelerate substantially before the driving connection with the shaft 36 is established. Accordingly, a sharp blow is imparted to the shaft each time the motor is started, thus releasing the locking engagement of the worm so that it may be turned easily to initiate the forward movement of the table.

Referring to Figs. 3 and 5 of the drawings, the pulley 76 in its preferred form comprises a pair of disk-shaped members 80 and 81 supported on the projecting end of the shaft 36 in face-to-face relation. The member 80 is formed with an integral hub portion 82 fitted over a bearing sleeve 83 by which the member is rotatably supported on the shaft. A cylindrical shell 84 having its outer peripheral surface grooved as at 85 is rigidly secured to the member 80 and constitutes the belt engaging portion of the pulley. The member 81 is similarly formed with an integral hub 86 and is nonrotatably secured to the shaft 36 by a key 87.

For transmitting the rotational movement of the member 80 to the member 81 and thus to the shaft 36, the members are provided on their adjacent faces with interfitting axial projections or teeth 88 and 89. In the exemplary structure, each member is provided with two generally segmental teeth disposed diametrically opposite each other and spaced apart so as to allow one member to turn substantially one quarter of a revolution relative to the other. Thus when the motor is stopped at the end of an indexing cycle the parts may occupy the position shown in Fig. 5 of the drawing, that is, with the rear faces of the teeth 88 in contact with the front faces of the teeth 89. When the member 80 is now rotated in a forward direction as at the beginning of the next indexing cycle, it is permitted to turn through approximately a quarter revolution before the front faces of the teeth 88 engage the rear faces of the teeth 89 to drive the member 81. As no load is imposed on the motor until such engagement, it is permitted to accelerate substantially and the engagement of the clutch teeth imparts a sharp blow to the member 81 and the shaft 36 at the beginning of the indexing cycle.

Suitable switch means is provided for starting, stopping and reversing the motor M in proper sequence for the performance of the indexing cycle above described. As shown in Fig. 6 of the drawings, switches F1 and R1 actuated by solenoids F and R are arranged respectively when closed to connect the motor with supply line conductors L1, L2 and L3, the motor operating to drive the table 10 forwardly when switch F1 is closed, and reversely when switch R1 is closed. An indexing cycle is started by momentary closure of a starting switch S which may be actuated manually or in any other preferred manner. Closure of the starting switch completes a circuit for a control relay CR which closes a switch CR1 to complete a holding circuit for itself and also closes a switch CR2 to complete a circuit for the solenoid F. The latter circuit includes a manually operable stop switch S1 and a normally closed switch R2 actuated by the solenoid R when nergized.

The holding circuit for the relay CR includes a limit switch LS1 actuated in response to movements of the table 10. This limit switch is supported on the machine base 11 at one side of the able 10 as shown in Fig. 2 and is arranged for actuation by a series of elongated dogs 90 mounted on and movable with the table, one such dog being provided for each indexed position of the table. Each dog 90 is positioned to close the switch LS1 by a forward motion and to open the same by a reverse motion at the instant the active stop-engaging member 26 meets the stop 25. The switch of course is opened immediately upon the advance of the dog beyond the switch.

The solenoid F in addition to closing the motor switch F1 also completes a holding circuit for itself by closing switch F2 and opens a switch F3 in the circuit of the solenoid R to prevent improper energization of the latter. The holding circuit for the solenoid F includes a normally closed limit switch LS2 arranged for actuation by a series of dogs 91 mounted on the table 10 similarly to the dogs 90 adjacent the several stopengaging members 26, there being one such dog for each stop-engaging member. The solenoid F accordingly remains energized by the holding circuit completed by the switch CR2 during the interval that the dog 91 passes and momentarily opens the switch LS2. The limit switch LS1 interrupts the circuit for the control relay CR and permits that relay to become deenergized upon the forward movement of the table. The dog 91 is arranged to engage and open the switch LS2 upon forward movement of the table through a distance slightly greater than the spacing of the indexed positions, that is, after the table has passed the succeeding indexed position from which it started.

With solenoid F energized and switch F1 closed, forward movement of the table continues until the next indexed position is passed whereupon the dog 91 associated with that position opens the limit switch LS2 to interrupt the circuit for the solenoid. Solenoid F becomes deenergized and interrupts the motor circuit by opening the switch F1 and closes switch F3 to prepare the circuit for the reverse solenoid R. Associated with the limit switch LS2 is a switch LS2A which is closed when the switch LS2 is opened. Switch LS2A on closing completes a circuit for the solenoid R which closes switch R1 to initiate reverse operation of the motor and also closes a switch R3 to complete a holding circuit. The circuit for the solenoid R additionally includes a switch LS1A associated with the limit switch LS1 and adapted to close as the companion switch closes.

With solenoid R energized and switch R1 closed, reverse movement of the table takes place until interrupted by engagement of the stop-engaging member 26 with the fixed stop 25 at which time the associated dog 90 actuates the switches LS1 and LS1A. The latter interrupts the circuit for solenoid R which in turn opens switch R1 to stop the motor. Relay R closes switch R2 to prepare the circuit for the solenoid F, thus conditioning the controls for operation in the next indexing cycle.

It will be apparent from the foregoing that the invention provides indexing mechanism of novel and advantageous construction particularly adapted for indexing shiftable machine elements such as the worktables of machine tools. The mechanism is adapted to advance the table step-by-step at high speed and to locate it very accurately at each indexed position. Moreover, the mechanism acts to positively lock the table in indexed position so that even the slightest movement of the table during a machining operation is effectually prevented. The mechanism is simple in construction, efficient and reliable in operation, and easy to keep in proper operating condition.

We claim as our invention:

1. The combination with a reversibly movable machine table, of mechanism for indexing the table to successive indexed positions comprising a stationarily supported stop member, a plurality of stop-engaging members carried by the table adapted to coact with said stop member only in the reverse movements of the table to accurately locate the table in said indexed positions, driving means including a worm wheel drivingly connected with the table, a shaft supported for rotation and rigidly held against axial movement, a worm fixed on said shaft and coacting with said worm wheel, reversible driving means for said shaft, a positively acting one-way clutch connecting said driving means and said shaft for rotating the shaft in a direction to advance the table, a friction coupling also connecting said driving means and said shaft whereupon on reverse rotation of said driving means, said clutch will be disengaged and said shaft will be rotated in the opposite direction by said friction coupling, means operable in response to the advance of the table past an indexed position for reversing said driving means, and means operative following the engagement of said stop member by one of said stop-engaging members for interrupting the reverse movement of the table, said friction coupling permitting said shaft to stop immediately upon such engagement of the members.

2. The combination with a reversibly movable machine table, of mechanism for indexing the table to successive indexed positions comprising a stationarily supported stop member, a plurality of stop-engaging members carried by the table adapted to coact with said stop member only in the reverse movements of the table to accurately locate the table in said indexed positions, a drive shaft operatively connected with the table for moving the same, a reversibly driven shaft, an overrunning clutch connecting said shafts and providing a one-way positive driving connection between said shafts when said driven shaft is rotated in a direction to move the table forwardly and being disconnected on reverse rotation of said drive shaft, and a friction coupling also connecting said shafts and providing a driving connection when said driven shaft is rotated in either direction and providing a frictional drive to said shaft during said reverse rotation and disengagement of said overrunning clutch, said friction coupling being adapted to slip when movement of the table is blocked by coaction of said stop and stop-engaging members.

3. The combination with a reversibly movable machine table, of mechanism for indexing the table to successive indexed positions comprising a stationarily supported stop member, a plurality of stop-engaging members carried by the table adapted to coact with said stop member only in the reverse movements of the table to accurately locate the table in said indexed positions, driving means for said table, power means, a positively acting one-way clutch connecting said means for moving the table in a forward direction, and a friction coupling also connecting said means for moving the table in the reverse direction during disengagement of said clutch, said friction coupling slipping to prevent damage to the driving means when reverse movement of the table is blocked by coaction of said stop and stop-engaging members.

4. The combination with a reversibly movable machine table, of mechanism for indexing the table to successive indexed positions comprising a worm wheel operatively connected with the table, a shaft supported for rotation and rigidly held against axial movement, a worm on said shaft coacting with said worm wheel to drive the same, a motor for driving said shaft, stop means for interrupting the movement of the table in an indexed position, means for stopping the motor upon such interruption of the table movement, said worm acting to positively lock the table against said stop, means for reversing said motor to move the table away from the stop, and impact producing coupling means connecting said motor and said shaft for imparting a sharp blow to the shaft to break the locking engagement of the worm and worm wheel upon reversal of said motor.

5. The combination with a reversibly movable machine table, of mechanism for indexing the table to successive indexed positions comprising a worm wheel operatively connected with the table, a shaft supported for rotation and rigidly held against axial movement, a worm on said shaft coacting with said worm wheel to drive the same, a motor for driving said shaft, stop means for interrupting the movement of the table in an indexed position, means for stopping the motor upon such interruption of the table movement, said worm acting to positively lock the table against said stop means, means for reversing said motor to move the table away from the stop means, and an impact producing coupling connecting said motor and said shaft, said coupling acting to complete the driving connection between the motor and the shaft after the motor is started whereby to impart a sharp blow to the shaft.

6. The combination with a rotatable machine table adapted to be indexed through successive indexed positions, a stationarily supported stop, stop-engaging means engageable with said stop in the reverse movement of the table to locate the same in said indexed positions, a worm wheel rigid with the table, a shaft supported for rotation but held against axial movement, a worm fast on said shaft coacting with said worm wheel, a motor for driving said shaft first in one direction to move the table past an indexed position and then in the reverse direction to carry said stop-engaging means into engagement with said stop, means for stopping the motor with the table in the indexed position, said worm acting to positively lock the table in such indexed position, and an impact producing coupling connecting said motor and shaft and operative when the motor is restarted for moving the table to the succeeding indexed position for imparting a sharp blow thereto to break the locking engagement between the worm and worm wheel.

EARNEST Y. SEBORG.
  WALTER M. FAIRBAIRN.

REFERENCES CITED

The following references are of record in the file of this patent:

UNITED STATES PATENTS

| Number | Name | Date |
| --- | --- | --- |
| Re. 22,324 | Newman | May 25, 1943 |
| 1,627,964 | Galloway | May 10, 1927 |
| 1,699,116 | Noack | Jan. 15, 1929 |
| 1,916,990 | Ransome | July 4, 1933 |
| 1,921,554 | Wellman et al. | Aug. 8, 1933 |
| 2,244,463 | Kingsbury et al. | June 3, 1941 |
| 2,411,739 | Luehrs | Nov. 26, 1946 |